United States Patent
Bonta et al.

(10) Patent No.: US 6,337,983 B1
(45) Date of Patent: Jan. 8, 2002

(54) METHOD FOR AUTONOMOUS HANDOFF IN A WIRELESS COMMUNICATION SYSTEM

(75) Inventors: Jeffrey D. Bonta, Arlington Heights; Robert T. Love, Barrington, both of IL (US); Matthew J. Dillon, Oxfordshire (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/772,226

(22) Filed: Jan. 29, 2001

Related U.S. Application Data

(60) Provisional application No. 60/216,419, filed on Jul. 6, 2000, and provisional application No. 60/213,033, filed on Jun. 21, 2000.

(51) Int. Cl.[7] ................................................. H04Q 7/20
(52) U.S. Cl. ....................... 455/437; 370/335; 370/336; 455/436
(58) Field of Search ................................. 455/436, 437, 455/438, 439, 442, 443, 444; 370/335, 336

(56) References Cited

U.S. PATENT DOCUMENTS

| | | | | |
|---|---|---|---|---|
| 4,718,081 A | * | 1/1988 | Brenig ......................... | 455/438 |
| 5,140,627 A | * | 8/1992 | Dahlin ......................... | 455/436 |
| 5,146,609 A | * | 9/1992 | Tayloe et al. ................. | 455/436 |
| 5,594,781 A | * | 1/1997 | Kozdon et al. .............. | 455/442 |
| 5,913,167 A | * | 6/1999 | Bonta et al. ................. | 455/438 |
| 5,915,221 A | * | 6/1999 | Sawyer et al. .............. | 455/437 |
| 5,940,761 A | * | 8/1999 | Tiedemann, Jr. et al. ... | 455/437 |

* cited by examiner

*Primary Examiner*—Nay Maung
*Assistant Examiner*—Quochien B. Vuong
(74) *Attorney, Agent, or Firm*—Kenneth A. Haas

(57) ABSTRACT

A method and apparatus for handoff to a rescue channel is introduced without the need to send and receive handoff control messages. In the preferred embodiment of the present invention, coordination of the rescue procedure at the infrastructure and mobile station is provided first by disabling the mobile transmitter followed by subsequent detection of signal loss and frame erasures at the serving cells, then by enabling the mobile transmitter followed by subsequent detection of signal by a rescue cell, and finally by enabling the rescue cell channel transmitter followed by subsequent detection and reception of signal and frames by the mobile.

11 Claims, 5 Drawing Sheets

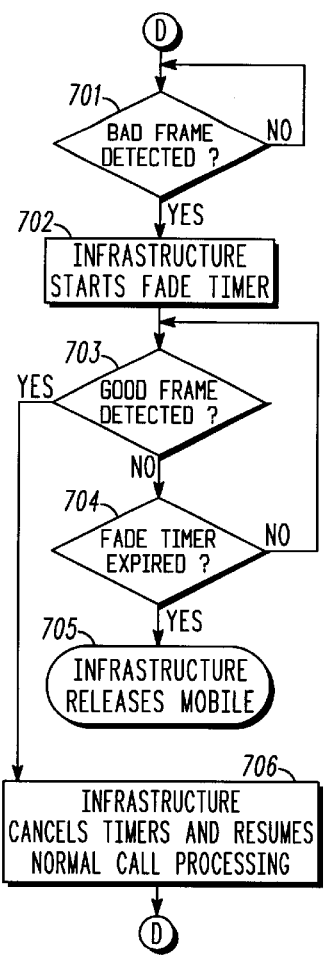
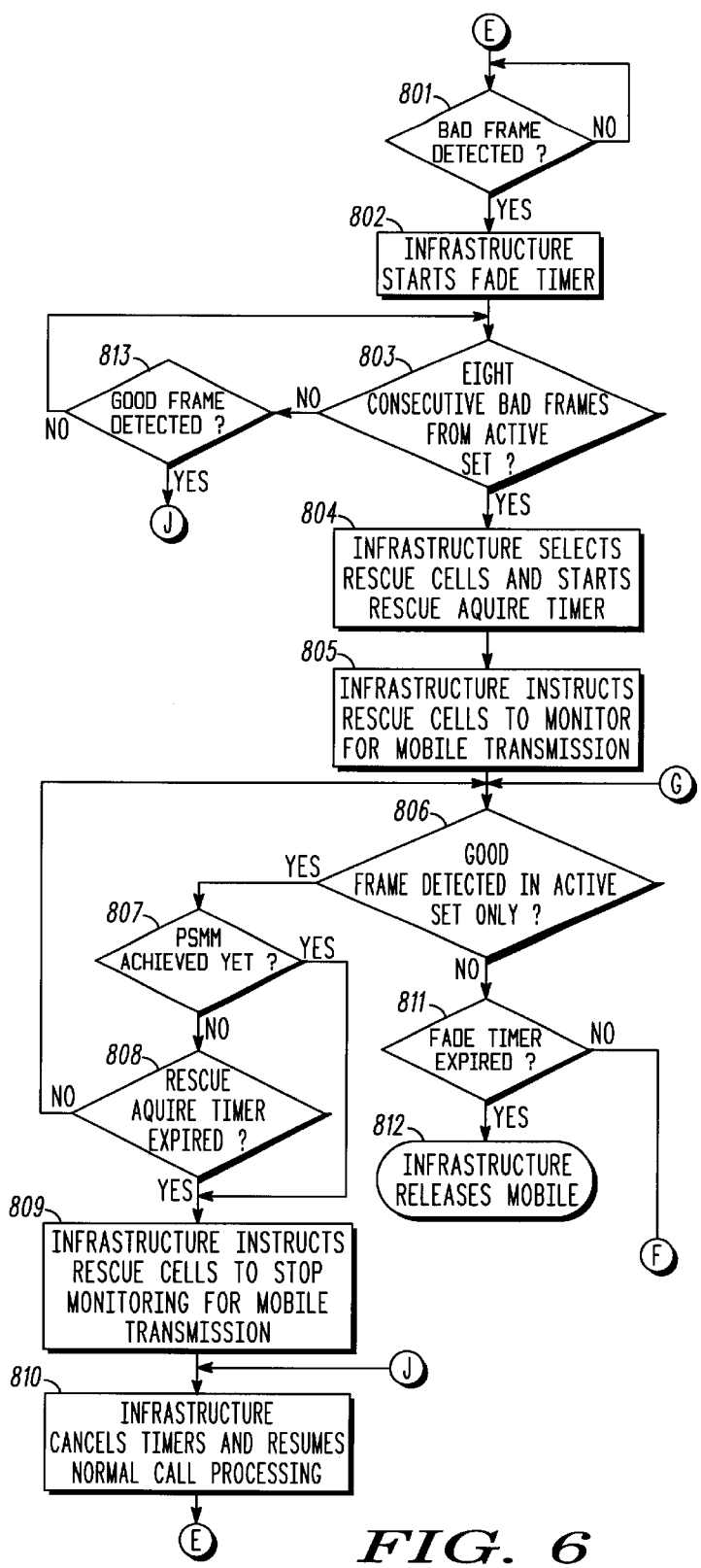
FIG. 5 —PRIOR ART—
FIG. 6

METHOD FOR AUTONOMOUS HANDOFF IN A WIRELESS COMMUNICATION SYSTEM

This appln claims benefit of Prov. No. 60/216,419 filed Jul. 6, 2000 and No. 60/213,033 filed Jun. 21, 2000.

FIELD OF THE INVENTION

The present invention relates generally to wireless communications systems and, more particularly, to a method for autonomous handoff from a first fixed communication unit to a second fixed communication unit in a wireless communication system.

BACKGROUND OF THE INVENTION

In a cellular communication system, signaling and voice or data communications between mobile communication units and fixed communication units (such as the infrastructure which is composed of cells) are carried over an RF channel. In a TDMA system such as GSM, the RF channel is an RF carrier and timeslot combination. In a CDMA system such as described by IS-95, IS-2000, or WCDMA, the RF channel is an RF carrier with signals from many communications independently spread with the use of orthogonal Walsh codes and other unique identifiers. As a mobile unit moves through a cellular system, it becomes necessary to support a handoff of the mobile unit from the first fixed communication unit to a second fixed communication unit. In the case of CDMA, this handoff might be a soft handoff that allows the first fixed communication unit to remain connected with the mobile unit along with the second fixed communication unit. Soft handoff then permits cell site diversity to improve the communication paths by combining the best signals from each fixed communication unit connection.

Cellular systems have always been faced with the challenge of reducing or eliminating dropped calls. However, in an interference-limited environment, when the traffic channel degrades, the ability for the mobile and the infrastructure to exchange signaling messages for the purpose of handover is severely hampered. If this message exchange cannot take place, then the necessary handover cannot occur to move the mobile out of its current degraded traffic channel condition. This ultimately results in a dropped call.

A partial solution to this problem is described in U.S. Pat. No. 5,913,167. METHOD FOR TRANSFERRING A COMMUNICATION LINK IN A WIRELESS COMMUNICATION SYSTEM, by Bonta, et al. The '167 patent provides the mobile with list of reserved channels that can be used for handoff from the first fixed communication unit to the second fixed communication unit when communication between the mobile unit and a first fixed communication unit is interrupted. Although the '167 patent provides a partial solution to this problem, no mechanism exists to insure that the mobile unit and the first fixed communication unit are time coordinated to perform what amounts to a blind handoff. If the mobile unit and the infrastructure are not time-coordinated, the mobile unit may attempt to perform a handoff to infrastructure equipment that is unprepared to accept the handoff. In addition, the prior art does not provide a mechanism for handling simultaneous communication breakdowns that would lead to simultaneous dropped calls. This is particularly a problem when trying to efficiently utilize equipment resources. Therefore, a need exists for efficiently performing an autonomous handoff within a wireless communication system that reduces the chances that infrastructure will be unprepared to accept the handoff when it occurs.

BRIEF DESCRIPTION OF THE DRAWINGS

FIG. 5 is a flow chart of an infrastructure procedure to handle frame errors in a CDMA system in accordance with the preferred embodiment of the present invention.

FIG. 6 is a flow chart of an infrastructure procedure to handle frame errors in a CDMA system in accordance with the preferred embodiment of the present invention.

DETAILED DESCRIPTION OF THE DRAWINGS

Figure 1:
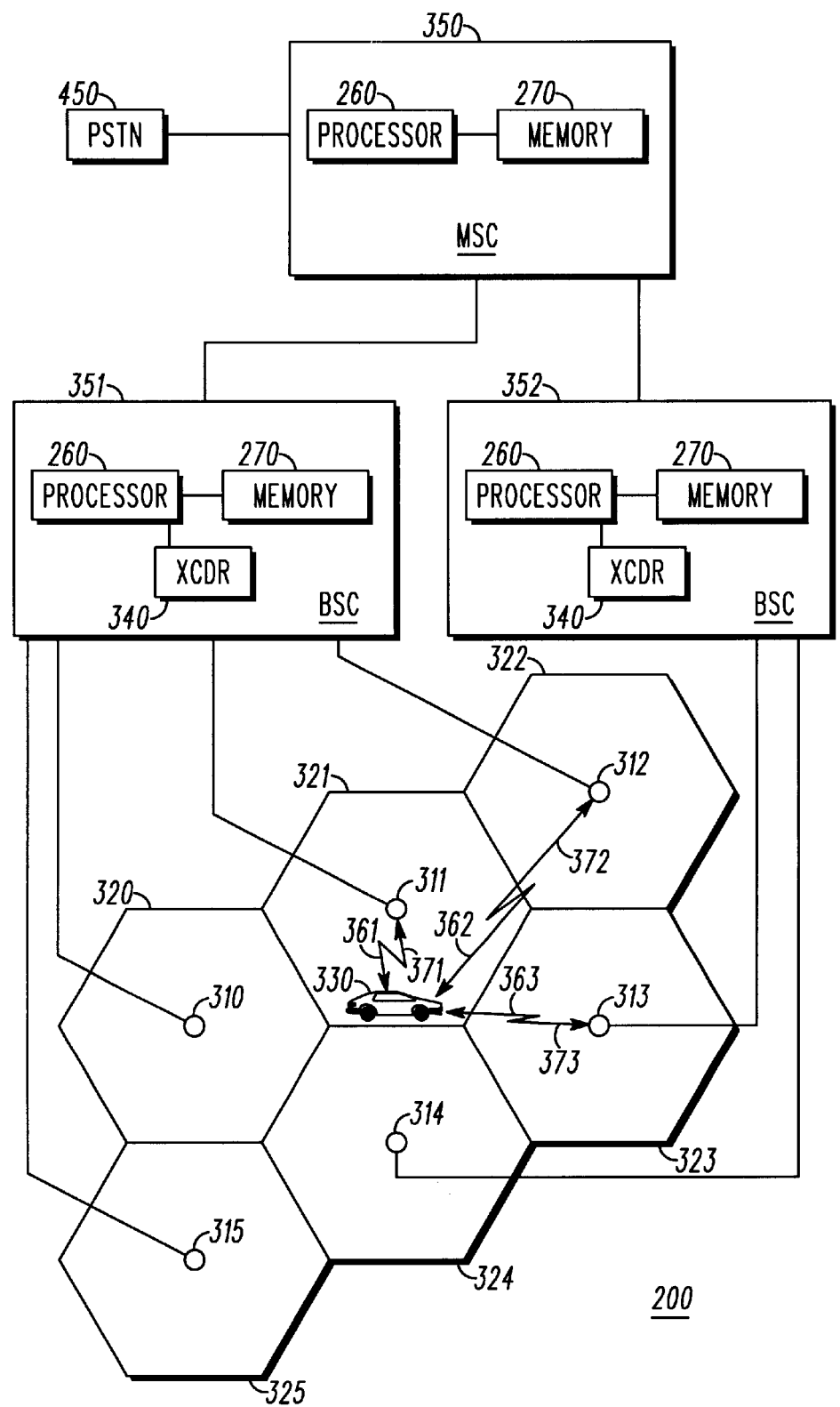
FIG. 1 is a diagram of a wireless communication system in accordance with the preferred embodiment of the present invention.

In order to address the above-mentioned needs, a method and apparatus for handoff to a rescue channel is introduced without the need to send and receive handoff control messages. In the preferred embodiment of the present invention, coordination of the rescue procedure at the infrastructure and mobile station is provided first by disabling the mobile transmitter followed by subsequent detection of signal loss and frame erasures at the serving cells, then by enabling the mobile transmitter followed by subsequent detection of signal by a rescue cell, and finally by enabling the rescue cell channel transmitter followed by subsequent detection and reception of signal and frames by the mobile.

To efficiently support simultaneous rescue operations for multiple mobiles, the infrastructure will handle simultaneous rendezvous actions in series. Thus, only one rescue channel needs to be reserved per cell. Mobile units having simultaneous breakdowns in communication will attempt to receive traffic/signaling frames utilizing the same Walsh code. However, only one of the mobiles will actually be able to receive the traffic/signaling frames without frame errors since the frames are spread based on a unique spreading code identified with the mobile station. Once the infrastructure has successfully performed a rendezvous with the first mobile, it will send a handover command (e.g. handoff direction message) to it to move to a normal traffic channel Walsh code. Meanwhile, the other (second) mobile will continue waiting on the reserved rescue channel. The infrastructure will again begin spreading the appropriate traffic based on the reserved spreading code and PN sequences unique to the second mobile. This will enable the second mobile to begin receiving good traffic frames so that it too can be handed off to a normal traffic channel spreading code.

With the inclusion of a coordination procedure for a rescue operation that enables a handoff to a rescue channel without the need to send and receive handoff control messages, the probability of a successful handoff is greatly increased. Specifically, by first disabling the mobile transmitter with subsequent detection of signal loss and frame erasures at the serving cells, then by enabling the mobile transmitter with subsequent detection of signal by a rescue cell, and finally by enabling the rescue cell channel transmitter with subsequent detection and reception of signal and frames by the mobile, the mobile will not hand off before infrastructure is ready. Additionally, by handling multiple mobile rescue operations in a serial manner only one rescue channel per cell is needed. Most importantly, this rescue channel procedure will greatly reduce the occurrence of dropped calls by performing a handoff that would normally fail when the traditional handoff control message are not able to be exchanged between the mobile and the infrastructure.

The rescue procedure is enhanced by initially attempting the transmission at maximum power an unacknowledged message from the mobile containing the current pilot channel signal strengths measured from the strongest n cells (subsequently this message will be referred to as an emergency PSMM). If this message is received prior to starting the rescue procedure, the information from this message will aid in selecting the appropriate rescue cell. To allow demodulation at the rescue cells it is necessary to provide them the current PN sequence states and spreading codes used to support the mobile channels. Specifically, for IS95 or IS2000 it is necessary to provide the current long code mask and offset into the short code PN sequence to the rescue cells. When the BSC or similar entity determines that all prior cells in the infrastructure's active set (i.e. set of previous serving cells that do not include potential "rescue cells") have fallen out of lock with the mobile, it will instruct other cells (the potential "rescue cells") from the current neighbor list (common to mobile station and infrastructure) to monitor the mobile given its current long code mask and its offset into the short code PN sequence.

If the emergency PSMM is received, the BSC can minimize the number of "rescue cells" involved in saving this call. Otherwise, in the preferred embodiment the BSC must determine which cells to use for rendezvous based on available information such as current neighbor list information and the last received PSMM. In an alternate embodiment, information on the proximity of the serving cells to the potential rescue cells in the neighbor list is also used.

In the preferred embodiment of the rescue procedure, when a rescue cell is able to lock a finger on the mobile, then that rescue cell will key it's reserved channel transmitter and inform the BSC so that that rescue cell is forced into the soft handoff connection with the mobile. The mobile is given a handoff command to move it off of the reserved rescue channel onto a normal traffic channel Walsh code, thus making way for handling future call cases of breakdowns in communication between the mobile and infrastructure.

Referring to the drawings, FIG. 1 illustrates a wireless communication system 200, such as a code division multiple access (CDMA) digital radiotelephone system. Fixed communication units such as base transceiver stations (BTS) 310, 311, 312, 313, 314, and 315, also referred to as cells, communicate with a mobile station 330, also referred to as a mobile unit, operating within area 321. Areas 320, 321, 322 and 325 are served by BTSs 310, 311, 312 and 315 respectively, while areas 323 and 324 are served by BTSs 313 and 314. BTSs 310, 311, 312 and 315 are coupled to a base station controller (BSC), 351, which includes, among other things, a transcoder (XCDR) 340, a processor 260, and a memory 270, and which is in turn coupled to a mobile switching center (MSC) 350, also including a processor 260, and a memory 270. Similarly, BTSs 313 and 314 are coupled to BSC 352 which includes, among other things, a XCDR 340, a processor 260, and a memory 270, and which in turn is also coupled to MSC 350. BSCs 351 and 352 may be referred to as a base station subsystem (BSS). A BSS may also be defined as a single BSC and its associated BTSs. MSC 350 is coupled to the public switched telephone network (PSTN) 450. The PSTN, MSC, and BSS are generically referred to as the infrastructure.

Wireless communication between BTSs 310, 311, 312, 313, 314, and 315 and mobile unit 330 occurs via radio frequency (RF) channels which provide physical paths over which digital communication signals such as voice and data are transmitted. Base-to-mobile unit communications are said to occur on a forward link, while mobile-to-base unit communications are referred to as being on a reverse link.

As shown in FIG. 1, a communication signal, 361 has been transmitted on the forward link channel such as a traffic channel, by base station 311 to mobile station 330. Additionally, a communication signal 371 has been transmitted on a reverse link channel such as a traffic channel by mobile station 330 in response to communication signal 361 from base station 311.

Wireless communication system 200 provides a number of logical channels (not shown) that are separated into two categories, traffic channels and signaling channels. The signaling channels are intended for carrying signaling information for broadcast control, mobile unit access control, synchronization, and mobility management. For example in Cellular System Remote unit-Base Station Compatibility Standard of the Electronic Industry Association/ Telecommunications Industry Association Interim Standard 95 or 2000 (IS-95 or IS-2000), the pilot channel and sync channel are physical channels which provide time synchronization while a third physical channel called the Paging channel is used for signaling and broadcasts system overhead information as well as sending pages. The pilot channel is used by all mobile units as a phase reference for demodulation as well as to establish initial time synchronization with the base station.. The pilot channel is also used as a measurement point by all mobile units for mobility management decisions. The traffic channels are intended for carrying encoded speech and data, but also support signaling for mobile station management. The mobile station management signaling on the traffic channel will either steal speech frames or will reduce the throughput of speech frames on the traffic channel, so the frequency of these transmissions is very low. There are several types of mobile station management signaling messages that are exchanged between the mobile unit and the BSC (in IS-95 and IS-2000) such as the neighbor list update message, in-traffic system parameters message, pilot strength measurement message (PSMM), handoff direction message, and the handoff complete message. Similar signaling is performed in WCDMA.

As is well known, mobile station management of handoff procedures are essential to maintaining a mobile station connection with the infrastructure as the mobile unit moves through wireless communication system 200. Without support of handoff, the movement of a mobile unit could result in a loss in signal strength between the mobile unit and the BTS that provides a traffic channel to support communication. For example, if mobile unit 330 in coverage area 321 served by BTS 311, moves out of coverage are 321 into coverage area 322, then the required signal strength would be insufficient to maintain communication between mobile unit 330 and BTS 311. However, if handoff procedures are supported, the mobile unit 330 could be instructed to establish communication with a traffic channel on BTS 312 such that communication signal 362 would be transmitted on the forward link from BTS 312 to mobile 330, and communication signal 372 would be transmitted on the reverse link to BTS 312 from mobile 330. In CDMA systems, it is essential to support soft handoff procedures that enable more than one BTS to be able to communicate with a mobile unit simultaneously. Among other things, this enables cell site diversity so that in a rapidly changing multi-path faded RF environment at any given instant in time, the BTS with the most favorable radio communication path with the mobile unit can be utilized to support the communication. For example, as mobile unit 330 is moving toward coverage area 322 from 321, a soft handoff procedure would enable both BTS 311 and BTS 312 to transmit forward link communication signals 361 and 362, respectively, to mobile unit 330, and BTS 311 and 312 could receive reverse link communication signals 371 and 372, respectively, from mobile unit 330. In this configuration, the best forward link communication signal, 371 or 372 from BTS 311 and BTS 312 respectively, would be selected by the mobile receiver. Likewise, the best reverse link communication signal, 361 or 362, would be selected by XCDR 340. In CDMA systems such as IS95 and IS2000, the mobile unit receives a neighbor list update message and an in-traffic system parameter message shortly after the call begins. A neighbor list is a list of cells and associated pilot channels that a mobile unit is required to periodically measure to determine whether the cell should be considered for handoff. Typically, these cells are geographically proximate to the cells currently serving the mobile. For example, BTS 310, 312, 313, and 314 are adjacent to BTS 311, and would likely be in the neighbor list for BTS 311. However, BTS 315 is not adjacent to BTS 311, so it might not be contained in the neighbor list for BTS 311. The neighbor list update message provides the mobile unit with information on the neighbor pilot channels it should measure to determine when a handoff to the neighbor cell is necessary. For example, when mobile unit 330 began the call on a traffic channel associated with BTS 311, it received a neighbor list update message containing pilot channel information for BTS 310, 312, 313, and 314. With this information, mobile unit 330 will measure the strength of the pilot channel associated with BTS 312 as the mobile unit moves from coverage area 321 toward coverage 322. The in-traffic system parameter message provides the mobile with, among other things, thresholds such as T_Add and T_Drop to govern the handoff procedure. When the strength of the pilot channel associated with BTS 312 is measured above the T_Add threshold, the mobile unit 330 will then be able to request that a soft handoff be established with BTS 312. This request is sent to the BSC 351 with the use of the PSMM message. BSC 351 will then select a traffic channel on BTS 312. Then BSC 351 will command BTS 312 to prepare the traffic channel for handoff and BSC 351 will send a handoff direction message back to the mobile with the identity of the selected traffic channel. Once mobile unit 330 receives the handoff direction message, it will return a handoff complete message back to BSC 351. This will complete the process of establishing a soft handoff between mobile unit 330 and BTS 311 and BTS 312. This handoff procedure is dependent on the successful delivery of these messages identified as communication signals 361 and 371.

In order to manage the pilot channel information that the mobile unit receives in the neighbor list update message or in the handoff direction message, it stores the information in one of 3 lists or sets; mobile unit's active set, candidate set, and neighbor set. The neighbor set contains pilot information for neighbors that are not sufficiently strong enough to be in a soft handoff connection. The mobile unit's active set contains pilot information for active soft handoff connections. The candidate set contains neighbor pilot information for BTSs that are strong enough to be in a soft handoff connection, but are awaiting a handoff direction message to promote them to the mobile unit's active set. In this example, the pilot associated with BTS 312 was in the candidate set after being measured by mobile unit 330 as being above the T_Add threshold, but prior to mobile unit 330 receiving the handoff direction message from BSC 351.

In CDMA systems such as the wireless communication system 200, multiple subscribers may transmit at the same time, sharing the same carrier frequency as the signaling control channel. To distinguish between different subscribers, each signaling channel and traffic channel is multiplied by a unique pseudo-noise (PN) code that is a combination of a long PN code, a short PN code, and also a Walsh code for the forward link. When the received signal containing this PN code is correlated (or despread) by the receiver with a unique mobile unit PN code, it enables the desired signal to be constructively added while the undesired signals from other mobile units in the case of the reverse link or from other cells (BTSs) in the case of the forward link to be averaged out as noise. Additionally, in the case of the forward link the other signals from the same serving BTS are orthogonal to the desired signal for a given demodulator due to the Walsh code properties and chip alignment of the same serving BTS signals. There are multiple Walsh codes associated with each BTS and these Walsh codes are shared between BTSs. At a BTS, each Walsh code is orthogonal with all others at that BTS and thus provides a unique traffic channel identifier for each call connection supported by the BTS. This enables the mobile unit to recover its intended forward link transmission from a BTS. However, since Walsh codes are shared between BTSs and all mobile units are on the same carrier frequency, it is necessary to have soft handoff connections between the mobile unit and the adjacent BTSs when the mobile unit is in an overlapping coverage region of the adjacent BTSs. Without the soft handoff connection, the mobile unit cannot obtain a diversity benefit from the signal transmitted from the other BTS covering the same region and suffers instead from increased interference from this other BTS. The likelihood of a dropped call is thus significantly increased if there is no soft handoff in the overlapping coverage regions.

Even with the support of soft handoff, there are many times that degraded traffic channel conditions will interrupt the ability for the mobile unit and the infrastructure to successfully perform a handoff procedure utilizing communication signals 361 and 371 in an interference-limited system. A common example occurs in an urban environment. Typically, as mobile unit 330 moves from coverage area 321 toward coverage area 322, the pilot strength of BTS 312 will begin to slowly rise. This would typically precipitate a soft handoff procedure, placing BTS 311 and BTS 312 in soft handoff with the mobile unit 330. However, in an urban environment, shadowing from tall buildings may prevent the mobile unit 330 from measuring a rise in the strength of the pilot channel for BTS 312 until the mobile unit moves into a line of sight with BTS 312 as a result of turning onto a street where BTS 312 is located. This may cause a rapid increase in the received pilot channel strength of BTS 312. If the increased pilot strength is sufficiently close to the pilot strength of BTS 311, then communication signal 361 will be interrupted. At that point, mobile unit 330 will experience consecutive frame errors that will prevent the necessary soft handoff procedure to be completed. The mobile unit 330 will be forced to drop the communication link with BTS 311, and the call will be dropped.

To solve these problems, a rescue channels is introduced. In the preferred embodiment of the present invention an agreed upon rendezvous or meeting place is communicated between the mobile and the infrastructure at a time when communications are not hampered by degraded traffic channel conditions. The meeting place is referred to as a rescue cell. This requires the reservation of a spare channel for each cell that might be used as a rescue cell. Each cell in a mobile's neighbor list may reserve one or more channels to handle potential breakdowns in communication between the mobile and infrastructure.

The mobile and infrastructure can re-establish a communication via one of these reserved channels, which in a CDMA system corresponds to a Walsh code. These Walsh codes are provided to the mobile under good signaling conditions as a part of the neighbor list update message. With these reserved Walsh codes, the mobile is now empowered to force one or more of the strongest pilot Walsh codes into it's active set in the event that communication is lost with the infrastructure (i.e. frame errors on the forward link (downlink) cause the mobile to turn off or dekey its transmitter). The mobile will only force reserved Walsh codes to be active from cells that are valid candidates for soft handoff, but are not able to be added due to the lost communication with the infrastructure. To enable the mobile to take this action of forcing these reserved cells into the mobile unit's active set, a coordinated set of actions must occur between the mobile unit and the infrastructure without dependence upon the ability to exchange handoff control messages.

As discussed above, a resource efficient method of coordinating these actions begins with the mobile attempting the transmission at maximum power an unacknowledged emergency PSMM message containing the current pilot channel signal strengths measured from the strongest n cells. If this message is received prior to starting the rescue procedure, the information from this message will aid in selecting the appropriate rescue cell. This emergency PSMM is sent at the mobile's maximum power to help improve the probability that the message is delivered successfully and with haste. Note that the emergency PSMM can be used prior to the dekey event when X number of consecutive erasures (where, in the preferred embodiment of the present invention, X is less than 12) are received to reduce the possibility of a dekey event. The benefit of early delivery of this message will enhance the ability of the infrastructure to select the minimal set of rescue cells to participate in the rendezvous.

As discussed previously, if the mobile unit and the infrastructure are not time-coordinated, the mobile unit may attempt to perform a handoff to the infrastructure equipment that is unprepared to accept the handoff. Thus, in the preferred embodiment of the present invention, the mobile disables its transmitter (i.e. dekeys) when consecutive frames are in error (typically 12 consecutive frames). The mobile also sets timers to allow the infrastructure to get prepared to accept a handoff while it continues to search for a rescue cell with a measured pilot signal strong enough to be a valid rescue cell to rendezvous with. Subsequent to the mobile dekeying, the infrastructure cells that are currently serving the mobile with a soft handoff connection will detect the mobile's transmitter dekeying when the respective fingers fall out of lock with the mobile (signal loss and frame erasures are symptoms of the fingers falling out of lock with the mobile). This causes the serving cells to inform the coordinating point within the infrastructure (BSC/XCDR) of the loss of communication with the mobile. If the BSC determines that all prior cells in the infrastructure's active set have fallen out of lock with the mobile, it will instruct other cells from the mobile's current neighbor list to monitor the mobile using its current long code mask and its offset into the short code PN sequence. These cells are potential "rescue cells". If the emergency PSMM was received, the BSC can minimize the number of "rescue cells" involved in saving this call. Otherwise, the BSC must determine which cells to use for rendezvous based on available information. This could be done with a variety of methods. For example, the BSC may select rescue cells based on current neighbor list information and the last received PSMM. Or the BSC could infer which cells should be used for rendezvous based on the current cells that are serving the mobile unit by selecting cells from the neighbor list that are in close proximity to the current cells. Or the BSC could select rescue cells based on historical data from previous dropped calls to probabilistically support the selection of rescue cells. Another method would be to use a predefined list of rescue cells that are most likely able to provide an adequate connection with the mobile, such as an overlay cell. Some predetermined time after each rescue cell is selected and is prepared to monitor for the reception of the mobile's signal, the mobile's timers that were set to allow time for the infrastructure to prepare for handoff will expire. At that time, the mobile unit will re-enable (key) its transmitter and force the rescue cell into its active set. Subsequently, if one of the rescue cell's that is monitoring the mobile is able to lock a finger on the mobile that is now keyed (transmitting), then that rescue cell will key it's reserved channel transmitter and inform the BSC. The BSC will then enable the rescue cell to be forced into the soft handoff connection with the mobile. When the mobile is able to lock a finger on the rescue cell and begin decoding frames from the infrastructure, the handoff to the rescue cell reserved channel is complete. Finally, the mobile is given a handoff command to move it off of the reserved rescue channel onto a normal traffic channel Walsh code, thus making way for handling future call cases of breakdowns in communication between the mobile and infrastructure.

Because time-coordination is performed prior to handing off to a rescue channel, in the preferred embodiment of the present invention the chances of being able to complete a handoff is greatly increased. More particularly, these coordination steps of disabling the mobile transmitter with subsequent detection of signal loss and frame erasures at the serving cells, followed by the enabling of the mobile transmitter with subsequent detection of signal by a rescue cell, and finally followed by enabling the rescue cell channel transmitter with subsequent detection and reception of signal and frames by the mobile enable a handoff to a rescue cell to occur without the need to send handoff control messages. Practically speaking, the preferred embodiment of the present invention greatly reduces the probability that a call will drop when communications break down between a mobile and the infrastructure. This is accomplished by providing a coordinated rescue procedure as an alternative to the traditional method to perform a handoff that uses handoff control messages embedded in traffic channel frames between the mobile and infrastructure.

It is possible that more than one mobile unit may simultaneously have a breakdown in communication in a coverage area served by the same cell or cells. In this situation, each mobile may need to rendezvous (i.e. set up a soft handoff connection) with the same rescue cell. There are two possible solutions for handling simultaneous breakdowns in communication between two or more mobiles and the infrastructure where the desired rescue cell is the same. One solution requires reserving a fixed number of Walsh codes per cell that are common to all mobiles who have that cell in its neighbor list. This requires an arbitration procedure to be added to insure that the mobile and infrastructure are in harmony with each other regarding the actual rescue Walsh code being used by a mobile. The arbitration is needed in the event that more than one mobile tried to use the same reserved Walsh code at the same time. In this scenario, the infrastructure transmits traffic channel frames to each of the mobiles on independent reserved Walsh codes. It would be up to the mobile to figure out which Walsh code was being used to transmit its traffic frames. This could be handled in different ways. In the preferred embodiment of the present invention the mobile that continued to received bad frames for a predefined period would automatically switch to the next Walsh code reserved for that cell. In an alternate embodiment, a hashing algorithm based on the mobile's ESN is used to select a Walsh code. In yet another embodiment, the mobile receives an indication from the rescue cell that the rescue cell is transmitting to the mobile's own identity or the mobile's call identity using this Walsh code. This indication could be in the form of periodic messages that reduce the forward link frame rate or as a field in the speech frame or as a mask of the speech frame. If the mobile did not receive this indication within a fixed period of time, then the mobile would automatically switch to an alternate reserved Walsh code for that cell. This procedure would continue until the mobile was able to find the correct Walsh code being used to rescue this call. The preferred solution to the varied arbitration schemes just discussed requires the infrastructure to control the simultaneous breakdowns in communication. In this solution, the infrastructure will handle the simultaneous rendezvous actions in series. In this case, only one rescue channel needs to be reserved per rescue cell. Both mobiles will try to receive traffic/signaling frames from the same Walsh code. However, only one of the mobiles will actually be able to receive the traffic/signaling frames without frame errors because the frames are spread based on the reserved Walsh code and scrambled based on the mobile's long code mask which is a function the mobile's ESN. Once the infrastructure has successfully performed a rendezvous with the first mobile, it will send a handover command to it to move to a normal traffic channel Walsh code. Meanwhile, the other mobile will continue to wait on the reserved rescue channel. Then when the infrastructure is ready, it will begin spreading the appropriate traffic based on the reserved Walsh code and scrambled based on the mobile's long code mask which is a function the mobile's ESN. This will enable the second mobile to begin receiving good traffic frames so that it too can be handed off to a normal traffic channel Walsh code.

Figure 2:
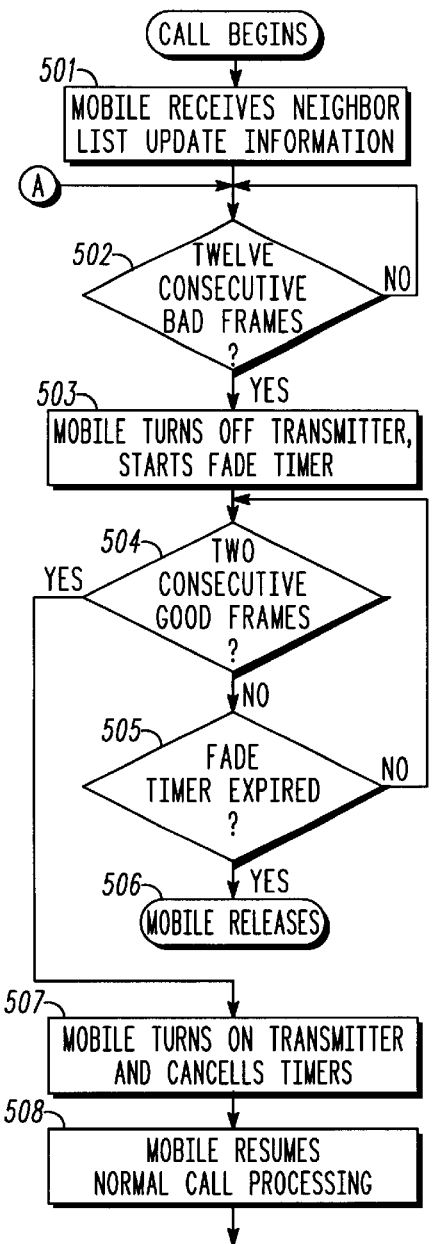
FIG. 2 is a flow chart of a mobile unit procedure to handle frame errors in a CDMA system in accordance with the preferred embodiment of the present invention.

FIG. 2 and FIG. 5 show a prior-art procedure for handling a breakdown in communications between the mobile unit and the infrastructure. FIG. 2 provides the procedure from the mobile unit's perspective and FIG. 5 provides the procedure from the infrastructure's perspective. Conventionally, after a call begins, a mobile unit 330 will receive neighbor list update information (501) periodically (e.g. at the beginning of the call and after each handoff). The mobile unit 330 will keep track of forward link frame errors. If twelve consecutive (502) frame errors are detected, the mobile will turn off its transmitter and start a fade timer (503). The fade timer typically is set to a period of 5 seconds. Turning off the transmitter will disable handoff procedures, closed loop power control, and transmission of traffic data. Turning off the transmitter will also have the effect of the infrastructure losing communication with the mobile unit, resulting in detection of reverse link frame errors. If two consecutive (504) forward link frames are received without error, the mobile unit 330 will cancel the fade timer (507) and turn on its transmitter once again. Normal call processing will resume (508) (i.e. handoff procedures, closed loop power control, and transmission of traffic data are enabled). If two consecutive (504) frames are not received without error before the fade timer expires (505), the mobile unit 330 will release (506) and will be recognized by the infrastructure as a dropped call.

Similarly, in FIG. 5, after a call begins, the infrastructure, for example BSC 351, will keep track of reverse link frame errors. If frame errors (701) are detected, the infrastructure will start a fade timer (702). The fade timer typically is set to a period of 5 seconds. If a reverse link frame (703) is received without error, the infrastructure (BSC 351) will cancel the fade timer (706) and normal call processing will resume (i.e. receipt of mobile signaling needed for handoff procedures and closed loop power control, as well as receipt of traffic data is enabled). If no reverse link frames (703) are received without error before the fade timer expires (704), the infrastructure (BSC 351) will release mobile unit 330 and this event will be recognized by the infrastructure as a dropped call.

Figure 3:
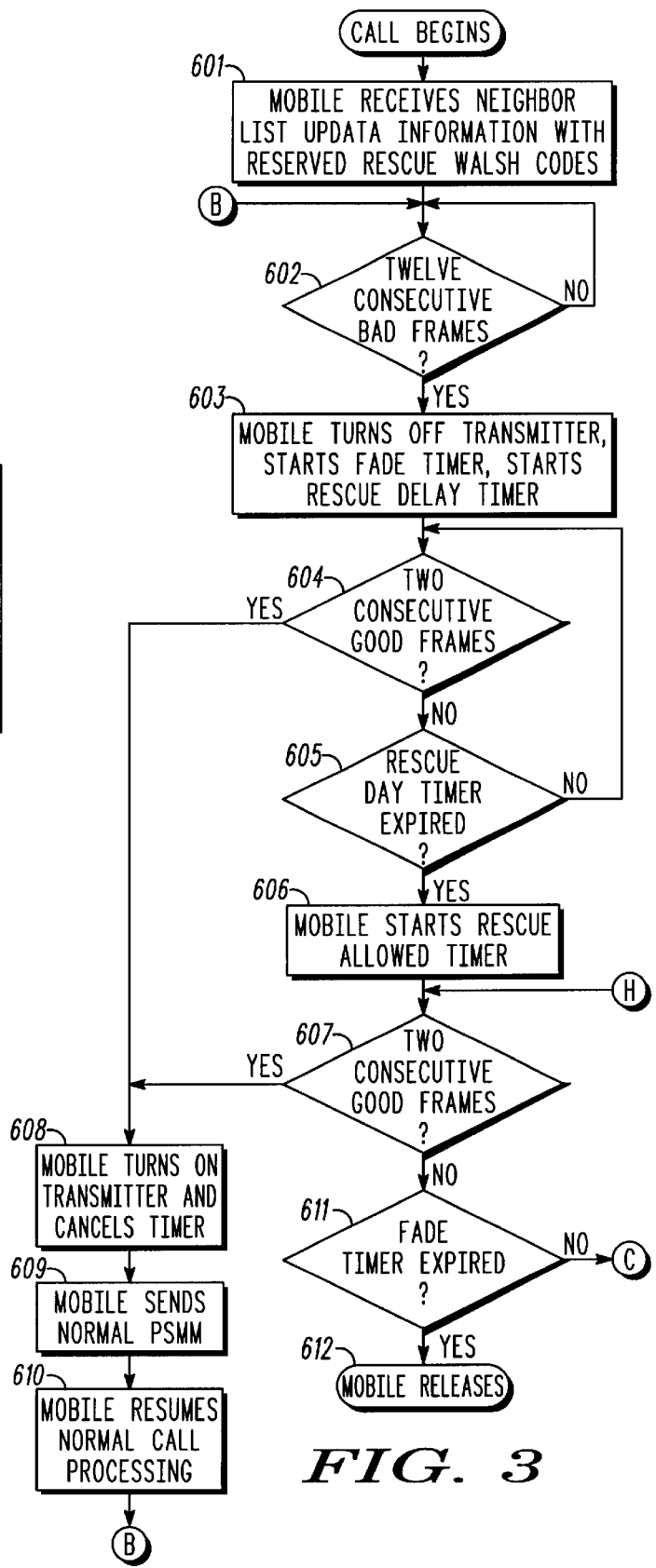
FIG. 3 is a flow chart of a mobile unit procedure to handle frame errors in a CDMA system in accordance with the preferred embodiment of the present invention.
Figure 4:
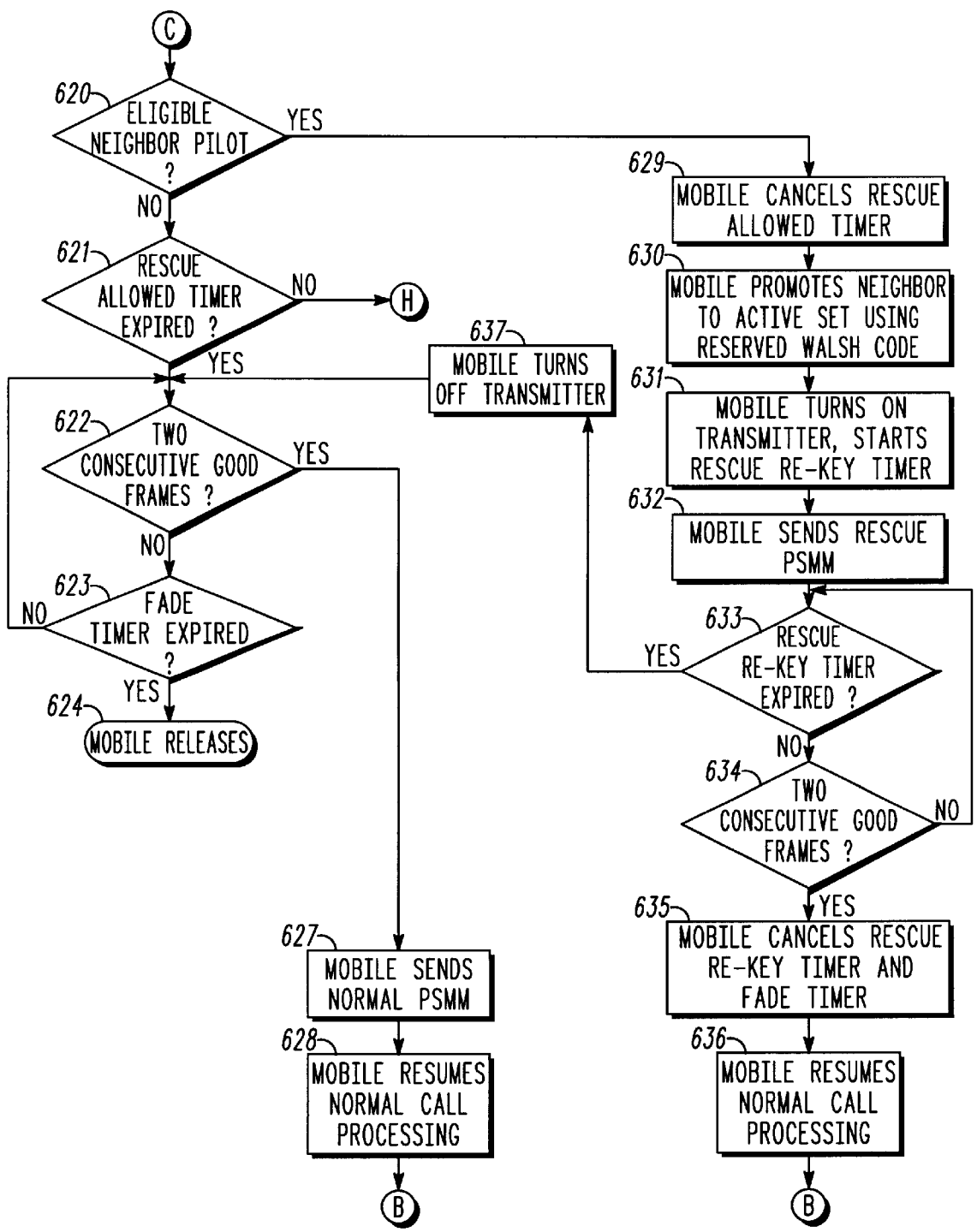
FIG. 4 is a flow chart of a mobile unit procedure to handle frame errors in a CDMA system in accordance with the preferred embodiment of the present invention.

In the preferred embodiment illustrated in FIG. 3 and FIG. 4, the treatment of forward link frame errors is handled uniquely to reduce the possibility of dropping the call. After a call begins, a mobile unit 330 will receive neighbor list update information (601) periodically (e.g. at the beginning of the call and after each handoff). This neighbor list update information will also contain reserved Walsh codes (one for each equipped rescue cell). As an example, assume that mobile unit 330 is being served by BSC 351 and BTS 311. The mobile unit 330 will keep track of forward link frame errors from BTS 311. If twelve consecutive (602) frame errors are detected, the mobile will turn off its transmitter and start a fade timer (603) as well as a rescue delay timer. The fade timer typically is set to a period of 5 seconds. The rescue delay timer is set to a period long enough to enable the infrastructure to prepare its resources for a possible rendezvous of mobile unit 330 with one of the infrastructure's (BSC 351) rescue cells using a reserved Walsh code and associated traffic channel. This rescue delay timer may be set to a range of values, but is typically set to 400 milliseconds. Turning off the transmitter will disable handoff procedures, closed loop power control, and transmission of traffic data. Turning off the transmitter will also have the effect of the infrastructure losing communication with the mobile unit, resulting in detection of reverse link frame errors. If two consecutive (604) forward link frames are received without error, the mobile unit 330 will cancel the fade timer (608) and rescue delay timer, and turn on its transmitter once again. With the transmitter turned on, the mobile unit 330 must now send a PSMM (609) to the infrastructure to let it know that the reserved rescue channels are not being used at this point in time. Normal call processing will resume (610) (i.e. handoff procedures, closed loop power control, and transmission of traffic data are enabled).

If two consecutive (604) frames have not been received without error and the rescue delay timer expires (605), the mobile unit 330 will start a rescue allowed timer (606). The rescue allowed timer is set to wait for the detection of an eligible neighbor pilot to rendezvous with (620). This timer can have a range of values, but would be less than 5 seconds. Again, if two consecutive (607) frames have not been received without error and the fade timer (611) expires, the mobile unit 330 will release (612) from the call and will be recognized by the infrastructure as a dropped call. However, if the fade timer (611) has not expired, the mobile unit will determine, based on the T_ADD threshold, if any neighbor cell pilot is an eligible candidate cell for promotion into the mobile unit's active set (620). This determination is possible since the mobile unit 330 is still measuring the strength of neighbor pilot channels as long as it is engaged in the call. If there are no eligible neighbor cells and the rescue allowed timer has not expired (621), the mobile unit 330 will continue to wait for either two consecutive good frames (607), expiration of the fade timer (611), detection of an eligible neighbor pilot (620), or expiration of the rescue allowed timer (621). If the rescue allowed timer expires, then the mobile again determines if two consecutive forward link frames have been received (622). If not and the fade timer (623) expires, the mobile will release and will be recognized by the infrastructure as a dropped call. If two consecutive good forward link frames are detected (622), the mobile unit 330 must now send a PSMM (627) to the infrastructure to let it know that the reserved rescue channels are not being used at this point in time. Normal call processing will resume (628) (i.e. handoff procedures, closed loop power control, and transmission of traffic data are enabled). If there is at least one eligible neighbor cell pilot (620) detected before the rescue allowed timer expires (621), for example BTS 312, then the mobile unit 330 will cancel the rescue allowed timer (629) and promote the eligible neighbor cell (BTS 312) or cells to the mobile unit's active set using the respective reserved Walsh code (630). Mobile unit 330 will then turn on its transmitter and start the rescue re-key timer (631). When the mobile turns on its transmitter, the mobile will begin transmitting as its last known closed loop power and begin gradually increasing this transmit power up to the nominal level permitted. However, other power control procedures are possible such as transmitting at a fixed power level, transmitting at a delta power increment over the last known closed loop power, or some combination. Typically, the rescue re-key timer would be set to a period of 40 milliseconds, but could be set up to 5 seconds. Next, the mobile unit 330 will send a PSMM to the infrastructure to let it know which reserved rescue channels are being used by this mobile. This will enable the infrastructure to release resources at rescue cells that the mobile unit is not including in the mobile unit's active set. At this time, the mobile unit must wait to see if it can receive two consecutive good frames now that these rescue cells are included in the active set (634). The mobile unit 330 will continue to wait for good frames until the rescue re-key timer expires (633). If the rescue re-key timer expires, the mobile unit will turn off its transmitter and will continue waiting for two consecutive good forward link frames (622), but will not allow the rendezvous procedure to resume. If the rescue re-key timer does not expire and two consecutive good forward link frames are received (634), then the mobile unit 330 will cancel the rescue re-key timer and the fade timer (635). Normal call processing will resume (636) (i.e. handoff procedures, closed loop power control, and transmission of traffic data are enabled). Mobile unit 330 will then be regarded as being in a soft handoff connection with both BTS 311 and BTS 312.

Figure 7:
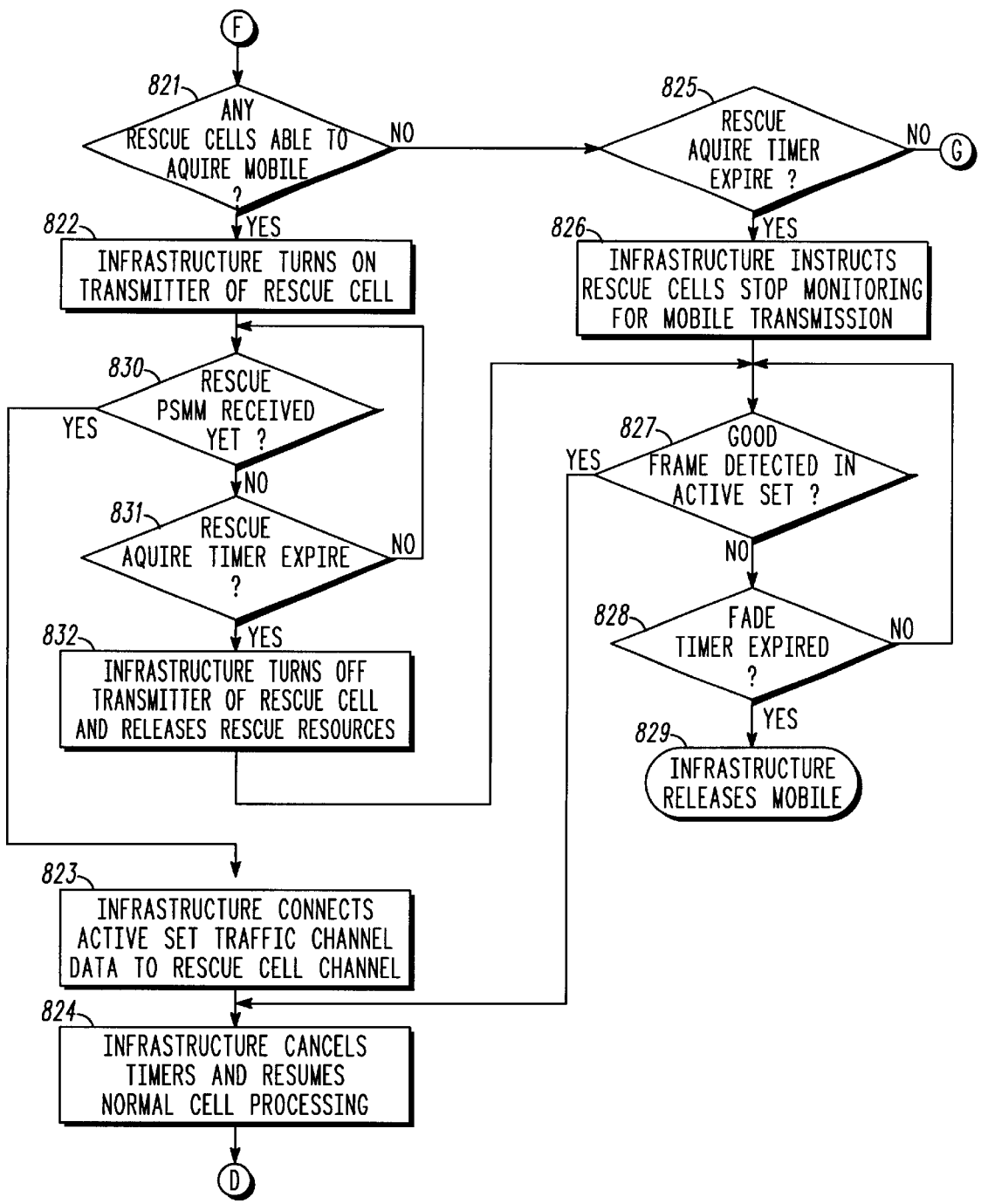
FIG. 7 is a flow chart of an infrastructure procedure to handle frame errors in a CDMA system in accordance with the preferred embodiment of the present invention.

Continuing with the same example using references from FIGS. 1, 6 and 7 of the preferred embodiment, the treatment of reverse link frame errors is handled uniquely to reduce the possibility of dropping the call. After a call begins for a mobile unit such as mobile unit 330, the infrastructure, for example BSC 351, will keep track of reverse link frame errors between mobile unit 330 and BTS 311. If frame errors (801) are detected, the infrastructure will start a fade timer (802). The fade timer typically is set to a period of 5 seconds. If eight consecutive frame errors are not detected (803), and a reverse link frame (813) is received without error, the infrastructure (BSC 351) will cancel the fade timer (810) and normal call processing will resume (i.e. receipt of mobile signaling needed for handoff procedures and closed loop power control, as well as receipt of traffic data is enabled). If eight consecutive frame errors are detected (803), the infrastructure (BSC 351) will select a rescue cell or cells (804) based on available static and dynamic configuration information such as, but not limited to, neighbor lists, infrastructure's active set, last received PSMM, historical events, statistics, and known overlapping coverage cells. In this example, the infrastructure (BSC 351) may select BTS 312 and BTS 313 as possible rescue cells. The infrastructure will also start a rescue acquire timer (804) and instruct the selected rescue cells to monitor mobile unit 330 in an attempt to acquire transmissions from the mobile unit (805). The monitoring action uses a receiver at BTS 312 and BTS 313 to acquire the mobile transmission. The acquire action includes determining if the measured signal level is above a threshold and determining if frames can be successfully decoded, but may only include determining if the measured signal level is above a threshold. The rescue acquire timer is set to 1 second, but can be set to a range of values between 20 milliseconds and 5 seconds. While the monitoring action is occurring, the infrastructure continues to evaluate whether a good reverse link frame is detected by one of the BTSs in the infrastructure's active set (BTS 311). If a good reverse link frame is received, the infrastructure tests whether a PSMM is received via communication signal 371. If a PSMM was received (807) or a PSMM was not received but rescue acquire timer expired (808), the infrastructure will know that the rendezvous with the rescue cells (BTS 312 and BTS 313) has failed. In this case, the infrastructure will instruct the selected rescue cells (BTS 312 and BTS 313) to stop monitoring for transmission from mobile unit 330 (809). The infrastructure will then cancel (810) the fade timer and rescue acquire timer (if still running). Normal call processing will resume (i.e. receipt of mobile signaling needed for handoff procedures and closed loop power control, as well as receipt of traffic data is enabled). However as a part of the monitoring action, if a good reverse link frame is not received (806) by one of the BTSs in the infrastructure's active set (BTS 311), the infrastructure tests whether the fade timer has expired (811). If the fade timer has expired, the infrastructure will release (812) mobile unit 330 and this event will be recognized by the infrastructure as a dropped call. If the fade timer has not expired, the infrastructure (BSC 351) checks to see if any of the rescue cells (BTS 312 or BTS 313) were able to acquire mobile unit 330 (821). If none of the selected rescue cells (BTS 312 or BTS 313) were able to acquire mobile unit 330, but the rescue acquire timer has not expired (825), the infrastructure will return to waiting to see if the next reverse link frame (806) can be detected by one of the BTSs in the infrastructure's active set (BTS 311). If no rescue cell (BTS 312 or BTS 313) is able to acquire mobile unit 330 and the rescue acquire timer expires, the infrastructure (BSC 351) will instruct (826) the selected rescue cells to stop monitoring for transmission from mobile unit 330. At this point, the infrastructure will no longer participate in a rendezvous with mobile unit 330. Instead, it will continue testing (827) to see if a good reverse link frame can be detected by one of the cells in the infrastructure's active set (BTS 311). If no reverse link frame is received without error before the fade timer expires (828), the infrastructure will release mobile unit 330 and this event will be recognized by the infrastructure as a dropped call (829). If the infrastructure receives a reverse link frame by one of the BTSs in the infrastructure's active set (BTS 311) without error, then the infrastructure will then cancel (824) the fade timer. Normal call processing will resume with the support of the BTSs in the infrastructure's (BSC 351) active set (BTS 311) (i.e. receipt of mobile signaling needed for handoff procedures and closed loop power control, as well as receipt of traffic data is enabled). If one or more of the selected rescue cells (821) is able to acquire mobile unit 330, the rescue cell (BTS 312) or cells will turn on its transmitter (822), thus enabling closed loop power control to be resumed. The infrastructure (BSC 351) must now wait for the receipt of a PSMM (830) with an indication that rescue channels were used by mobile unit 330. If the rescue acquire timer expires (831) before the PSMM is received, then the infrastructure will turn off the rescue cell transmitter (BTS 312) and will release rescue cell resources associated with this rescue attempt (832). The infrastructure will no longer participate in a rendezvous with mobile unit 330. Instead, it will continue testing (827) to see if a good reverse link frame can be detected by one of the cells in the infrastructure's active set (BTS 311). If the PSMM is received (830), the infrastructure (BSC 351) will connect the traffic data (823) currently being supplied to the infrastructure's active set cells (BTS 311) to the reserved rescue channel on the rescue cell (BTS 312) that is now in the mobile unit 330 active set. This rescue cell is now added to the infrastructure's active set, and the rendezvous is complete with the cancellation of the fade timer and rescue acquire timer. Normal call processing will resume with the support of the BTSs in the infrastructure's (BSC 351) active set (BTS 311 and BTS 312) (i.e. receipt of mobile signaling needed for handoff procedures and closed loop power control, as well as receipt of traffic data is enabled). In the preferred embodiment, the infrastructure may now command the mobile unit 330 to move off of the reserved rescue channel onto a regular traffic channel not normally reserved for a rendezvous. This is accomplished with the use of the handoff direction message.

The preferred embodiment uses frame errors to detect the need to begin a rendezvous, but other metrics such as bit errors, multiframe errors, signaling discontinuity, or absence of measurable signal are other mechanisms to trigger the start of this rendezvous algorithm.

In an alternate embodiment, the mobile unit 330 sends a PSMM to the infrastructure using up to its maximum transmit power. This occurs just prior to step 602, after 6 consecutive reverse link frame errors are detected, or it may occur some time after step 602. If the PSMM is sent after 602, then the mobile unit will need to briefly turn on its transmitter long enough to send the PSMM. If the infrastructure (BSC 351) is able to receive the PSMM prior to 804, then the infrastructure can use this information to assist in selecting the rescue cell or cells.

In yet a further alternate embodiment, the mobile unit uses mechanisms other than a PSMM for informing the infrastructure of which rescue cells it is using for rescue, such as sent in step (632) and received in step (830). For example, an indication of the rescue cells being used by mobile unit 330 may be signaled repeatedly in the first few frames exchanged between mobile unit 330 and the rescue cell (BTS 312) as a new message. Alternatively, the information could be transmitted on a separate channel such as an access burst on an access channel similar to the procedure used on a new call origination.

In an alternate embodiment, the mobile unit may not turn off its transmitter as a result of detecting frame errors. Such is the case for TDMA systems such as Global System for Mobile Communication (GSM) or iDEN. In this case, the infrastructure needs some indication that the mobile unit is intending to use a rescue channel when forward link frames are not being received. This can be accomplished by either permanently enabling the rescue channel to receive a mobile unit that needs a rescue cell, or it can be accomplished by having the mobile unit toggle its transmitter off, then back on again long enough for the infrastructure to detect the fluctuation of signal from the mobile unit as a special signal of the need to rendezvous. This special signal may be performed as a series of transmitter toggles through off and on states to further qualify it as a special signal.

While the invention has been particularly shown and described with reference to a particular embodiment, it will be understood by those skilled in the art that various changes in form and details may be made therein without departing from the spirit and scope of the invention. It is intended that such changes come within the scope of the following claims.

We claim:

1. A method for a mobile unit to perform autonomous handoff within a communication system, the method comprising the steps of:
   determining that a poor communication exists between the mobile unit and a base station;
   de-keying a transmitter to break communication with the base station, causing a rescue base station to set up receiver resources to listen for the mobile unit; and
   after a predetermined period of time, reactivating the transmitter causing the rescue base station to enable its transmitter to communicate to the mobile unit.

2. The method of claim 1 wherein the step of determining that the poor communication exists between the mobile and the base station comprises the step of detecting that a predetermined amount of bad frames has been received from the base station.

3. The method of claim 1 further comprising the step of assigning receiver resources to communicate with the rescue base station.

4. The method of claim 1 wherein the step of de-keying the transmitter to break communication comprises the step of turning off the transmitter to break communication.

5. A method for a mobile unit to perform autonomous handoff within a communication system, the method comprising the steps of:
   communicating with a first base station;
   receiving an active set of base stations from the first base station;
   determining that a poor communication exists between the mobile and the first base station;
   de-keying a transmitter to break communication with the first base station;
   after a predetermined period of time, adding a second base station to the active set of base stations without being instructed to do so by any base station; and
   receiving transmission from the second base station.

6. The method of claim 5 wherein the step of determining that poor communication exists comprises the step of determining that a predetermined amount of bad frames has been received.

7. A method for autonomous handoff, the method comprising the steps of:
   detecting that communication with a first base station has been lost;
   de-keying a transmitter in response to the detection that communication with the first base station has been lost;

determining a list of candidate base stations for autonomous handoff;

re-keying the transmitter to send a message to the first base station in order to facilitate the autonomous handoff to a second base station.

8. The method of claim 7 wherein the step of re-keying the transmitter comprises the step of re-keying the transmitter at a full power level.

9. The method of claim 7 wherein the step of detecting that communication with the first base station has been lost comprises the step of detecting that a predetermined amount of bad frames has been received from the first base station.

10. The method of claim 7 wherein the step of de-keying the transmitter in response to the detection that communication with the first base station has been lost comprises the step of turning off the transmitter in response to the detection that communication with the first base station has been lost.

11. A method for autonomous handoff within a communication system, the method comprising the steps of:

determining that a first mobile unit has lost communication;

determining that a second mobile unit has lost communication;

determining that a similar base station needs to rescue both the first and the second mobile unit;

communicating with the first mobile unit on a rescue channel;

forcing a handover of the first mobile unit to a second channel served by the similar base station based on the determination that the similar base station needs to rescue both the first and the second mobile unit; and communicating with the second mobile unit on the rescue channel after the forced handover.

* * * * *